US012584871B2

(12) United States Patent
Himeda et al.

(10) Patent No.: US 12,584,871 B2
(45) Date of Patent: Mar. 24, 2026

(54) INFORMATION PROCESSING APPARATUS, INFORMATION PROCESSING METHOD, NONTRANSITORY COMPUTER READABLE MEDIA STORING PROGRAM, AND X-RAY ANALYSIS APPARATUS

(71) Applicant: Rigaku Corporation, Tokyo (JP)

(72) Inventors: Akihiro Himeda, Tokyo (JP); Takumi Ohta, Tokyo (JP)

(73) Assignee: RIGAKU CORPORATION, Tokyo (JP)

( * ) Notice: Subject to any disclaimer, the term of this patent is extended or adjusted under 35 U.S.C. 154(b) by 633 days.

(21) Appl. No.: 17/991,900

(22) Filed: Nov. 22, 2022

(65) Prior Publication Data

US 2023/0194443 A1     Jun. 22, 2023

(30) Foreign Application Priority Data

Dec. 21, 2021     (JP) ................................. 2021-206726

(51) Int. Cl.
*G01N 23/20* (2018.01)
*G06N 3/08* (2023.01)
(Continued)

(52) U.S. Cl.
CPC .............. *G01N 23/20* (2013.01); *G06N 3/08* (2013.01); *G01N 23/20008* (2013.01);
(Continued)

(58) Field of Classification Search
USPC ........................................................ 702/189
See application file for complete search history.

(56) References Cited

U.S. PATENT DOCUMENTS

2016/0258890 A1* 9/2016 Zarkadas ......... G01N 23/20083
2019/0120610 A1* 4/2019 Wu ......................... G06N 3/084
(Continued)

FOREIGN PATENT DOCUMENTS

JP        2010-249784 A      11/2010
JP         2020522883 A       7/2020
(Continued)

OTHER PUBLICATIONS

Greco, A., et al. Fast Fitting of Reflectivity Data of Growing Thin Films Using Neural Networks. Journal of Applied Crystallography [online], Dec. 2019 [retrieved on Jun. 10, 2025]. Retrieved from the Internet: <https://journals.iucr.org/j/issues/2019/06/00/vh5106/index.html>. (Year: 2019).*

(Continued)

*Primary Examiner* — Paul D Lee
(74) *Attorney, Agent, or Firm* — XSENSUS LLP

(57) ABSTRACT

According to an aspect of the present invention, provided is an information processing apparatus comprising a memory configured to store a program; and a processor configured to execute a program so as to output a parameter result in relation to a thin film by inputting a profile result in relation to an intensity of X-ray from the thin film to a neural network, wherein the neural network is a neural network that is allowed to machine-learn teacher data using profile data in relation to an intensity of X-ray from a thin film as input data and using parameter data in relation to the thin film as output data.

10 Claims, 10 Drawing Sheets

(51) Int. Cl.

| | |
|---|---|
| *G01N 23/20008* | (2018.01) |
| *G01N 23/201* | (2018.01) |
| *G01N 23/207* | (2018.01) |

(52) U.S. Cl.
CPC ......... *G01N 23/201* (2013.01); *G01N 23/207* (2013.01); *G01N 2223/052* (2013.01); *G01N 2223/054* (2013.01); *G01N 2223/056* (2013.01); *G01N 2223/0566* (2013.01); *G01N 2223/1016* (2013.01); *G01N 2223/305* (2013.01); *G01N 2223/61* (2013.01)

(56) References Cited

U.S. PATENT DOCUMENTS

| | | | | |
|---|---|---|---|---|
| 2020/0026196 | A1* | 1/2020 | Luo .................... | G06V 10/7784 |
| 2020/0033820 | A1* | 1/2020 | Furuya ................... | G06N 20/00 |
| 2020/0140993 | A1* | 5/2020 | Noh ................ | G01N 23/20058 |
| 2023/0037015 | A1* | 2/2023 | Fukada ................... | G06N 3/09 |
| 2023/0169255 | A1* | 6/2023 | Pandev .................. | G06F 30/27 |
| | | | | 716/110 |

FOREIGN PATENT DOCUMENTS

| | | | |
|---|---|---|---|
| JP | 2021-063829 | A | 4/2021 |
| WO | 2015/125395 | A1 | 8/2015 |

OTHER PUBLICATIONS

Japanese Office Action issued Feb. 12, 2025 in corresponding Japanese Patent Application No. 2021-206726, 6 pages.
Japanese Office Action issued Dec. 3, 2024 in corresponding Japanese Patent Application No. 2021-206726, 8 pages.
Hongyang Dong et al., "A deep convolutional neural network for real-time full profile analysis of big powder diffraction data", Computational Materials, United Kingdom, Jan. 21, 2005, Nature, Sep. 2024, vol. 7, No. 74, pp. 1.

* cited by examiner

1000

100

300

200

1

INFORMATION PROCESSING APPARATUS, INFORMATION PROCESSING METHOD, NONTRANSITORY COMPUTER READABLE MEDIA STORING PROGRAM, AND X-RAY ANALYSIS APPARATUS

CROSS REFERENCE TO RELATED APPLICATIONS

The present application claims priority under 35 U.S.C. § 119 to Japanese Patent Application No. 2021-206726, filed Dec. 21, 2021.

BACKGROUND

Technical Field

The present invention relates to an information processing apparatus, an information processing method, a non-transitory computer readable media storing a program, and an X-ray analysis apparatus, which use machine learning to rapidly optimize a parameter in relation to a thin film when analyzing the thin film by reflectance measurement, rocking curve measurement, GI-SAXS (Grazing incidence small-angle X-ray scattering) measurement, or the like.

Related Art

In the analysis of a thin film using an X-ray analysis apparatus, a profile result representing X-ray intensity from the thin film is obtained and fitted to a profile generated from a structural model of the thin film to determine parameter in relation to the thin film. For instance, in reflectance measurement, the X-ray intensity is a reflected intensity from the thin film, and the parameter is film thickness, density, roughness, or the like of the thin film. In rocking curve measurement, the X-ray intensity is a diffraction intensity from the thin film, and the parameter is lattice constant, film thickness, composition, or the like of the thin film. In GI-SAXS, the X-ray intensity is a scattering intensity from the thin film, and the parameter is size distribution of the thin film, such as pore size or particle size. In these analyses, optimization method such as global optimization is used to estimate an initial value of the parameter of the thin film. Local optimization is then used to refine the initial value.

In Japanese Patent Application Publication No. 2010-249784, a method of obtaining an optimal solution by a global optimization method in an analysis of X-ray diffraction result from rocking curve measurement for estimating film thickness and composition of a thin film is disclosed.

However, the analysis using the global optimization method disclosed in Japanese Patent Application Publication No. 2010-249784 has a problem that requires a large amount of time for analysis.

One of the purposes of the present invention is to solve such a problem and is to provide an X-ray analysis apparatus or the like, which can analyze result of reflectance measurement, rocking curve measurement, GI-SAXS measurement, etc. and rapidly optimize parameter in relation to a thin film.

According to an aspect of the present invention, provided is an information processing apparatus comprising a memory configured to store a program; and a processor configured to execute a program so as to output a parameter result in relation to a thin film by inputting a profile result in relation to an intensity of X-ray from the thin film to a neural network, wherein the neural network is a neural network that is allowed to machine-learn teacher data using profile data in relation to an intensity of X-ray from a thin film as input data and using parameter data in relation to the thin film as output data.

DETAILED DESCRIPTION

Hereinafter, embodiments of the present invention will be described with reference to the drawings. Various features described in the embodiment below can be combined with each other.

Definition

A program for realizing a software in the present embodiment may be provided as a non-transitory computer readable medium that can be read by a computer or may be provided for download from an external server or may be provided so that the program can be activated on an external computer to realize functions thereof on a client terminal (so-called cloud computing).

In the present embodiment, the "unit" may include, for instance, a combination of hardware resources implemented by a circuit in a broad sense and information processing of software that can be concretely realized by these hardware resources. Further, various information is performed in the present embodiment, and the information can be represented by, for instance, physical values of signal values representing voltage and current, high and low signal values as a set of binary bits consisting of 0 or 1, or quantum superposition (so-called qubits), and communication/calculation can be performed on a circuit In a broad sense.

Further, the circuit in a broad sense is a circuit realized by combining at least an appropriate number of a circuit, a circuitry, a processor, a memory, and the like. In other words, it is a circuit which includes application specific integrated circuit (ASIC), programmable logic device (e.g., simple programmable logic device (SPLD), complex programmable logic device (CPLD), and field programmable gate array (FPGA)), and the like.

Parameter has value to be optimized and value to be given as fixed value. The parameter to be optimized during analysis is information having one or more of the following: film thickness, density, roughness, composition, lattice constant, and size distribution of a thin film. More specifically, for the parameter in reflectance measurement, element or composition of a substrate or a thin film are fixed, and film thickness, density, and roughness of the thin film are optimized. For the parameter in rocking curve measurement, the density of the thin film or lattice constant of the substrate are fixed, and thickness and composition of the thin film are optimized. Furthermore, for the parameter in GI-SAXS measurement, density of the thin film and air or particle are fixed, and size distribution of pore size or particle size of the thin film are optimized. The term parameter is used herein as a concept that includes both parameter result and parameter data.

Figure 1:
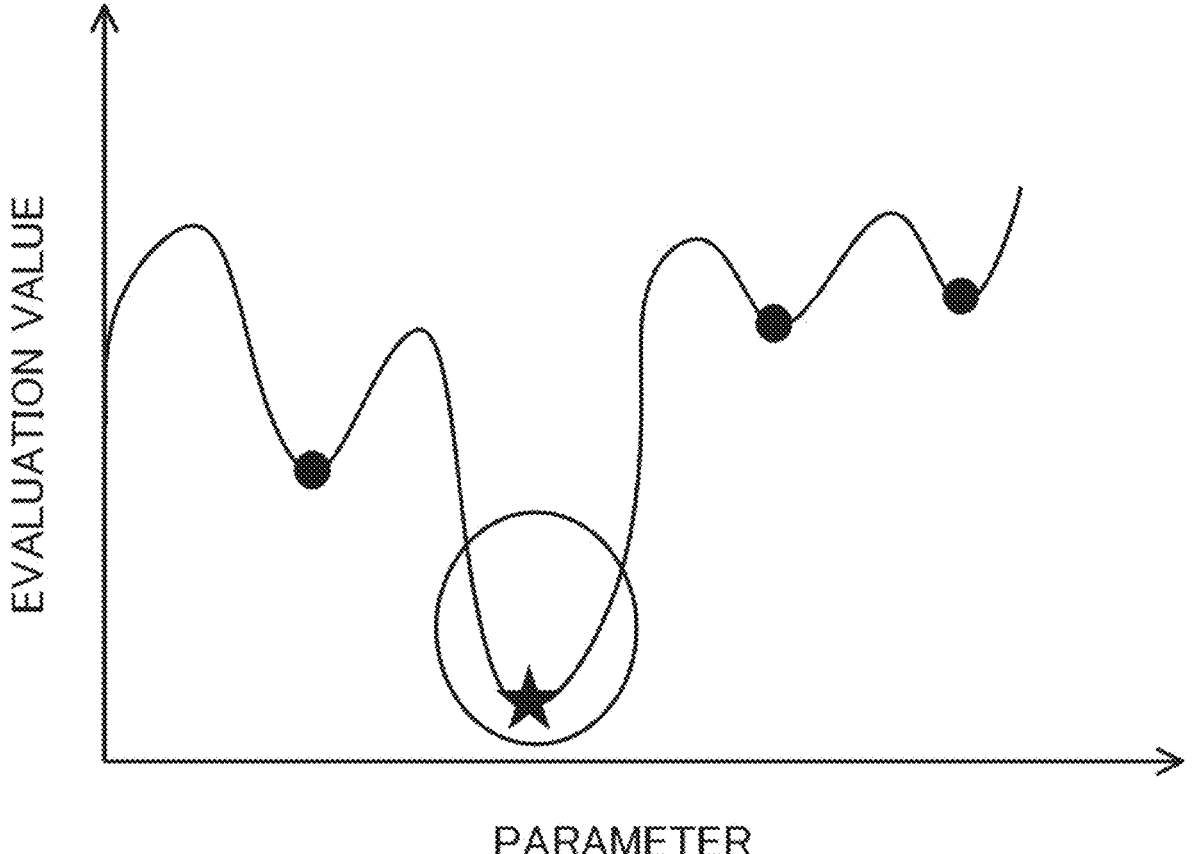
FIG. 1 illustrates parameters for correct solution, false solution, and initial value.

FIG. 1 illustrates parameters for correct solution, false solution, and initial value.

FIG. 1 shows several minimum values in a graph with evaluation value on vertical axis and parameter on horizontal axis. In the graph as shown in FIG. 1, the parameter with smallest evaluation value is closer to a correct solution. Here, the parameter with the correct solution is the minimum value with the smallest evaluation value and is indicated by a star in FIG. 1. False solution parameter is minimum value other than the correct solution, and is indicated by a black circle in FIG. 1. An initial value parameter is a point in a parameter region that is close to the correct solution parameter and is in a region enclosed by an ellipse. Using a global optimization method, the initial value parameter in the region enclosed by the ellipse can be obtained. Here, by applying a local optimization method to the initial value parameter, the correct solution parameter can be obtained. The local optimization method includes a least-squares method. The initial value parameter is also expressed as a substantially correct solution parameter since it is a point in the parameter region that is close to the correct solution parameter.

Figure 2:
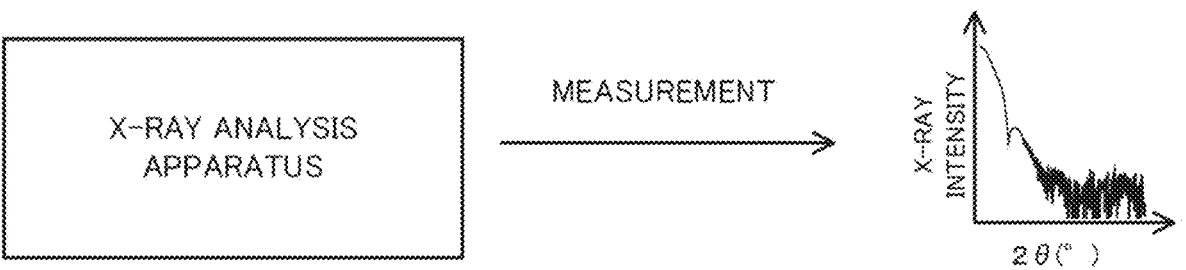
FIG. 2 illustrates a measurement profile.

FIG. 2 illustrates a measurement profile. The measurement profile is data representing X-ray intensity of a thin film measured by an X-ray analysis apparatus. By analyzing it, parameter can be obtained.

Figure 3:
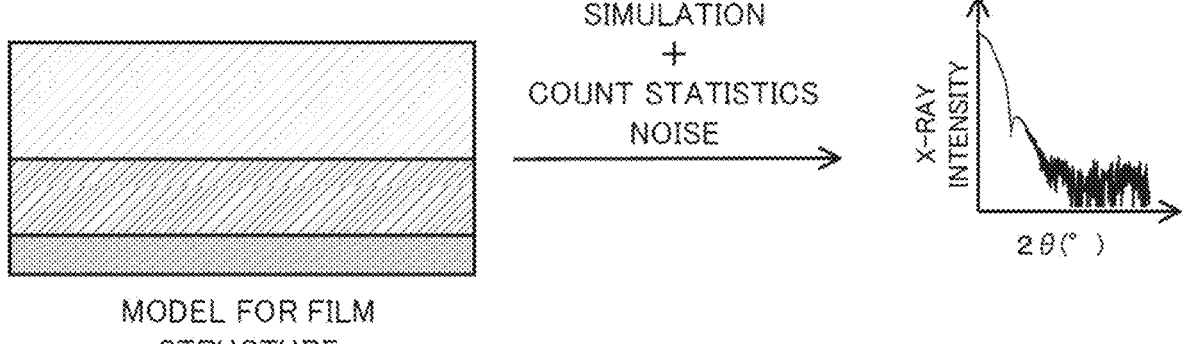
FIG. 3 illustrates a measurement simulation profile.

FIG. 3 illustrates a measurement simulation profile. The measurement simulation profile is generated by simulating X-ray intensity for a pre-parameterized film model and adding noise according to statistics or probability theory, such as Poisson distribution.

In the present specification, the term profile is used herein as a concept that includes any of the measurement profile and the measurement simulation profile. The term profile is also used herein as a concept that includes both profile result and profile data.

First Embodiment

First embodiment describes a case of quickly obtaining parameter by reflectance measurement.
1. System Configuration Hereinafter, an example of an information processing system 1000 will be described.

Figure 4:
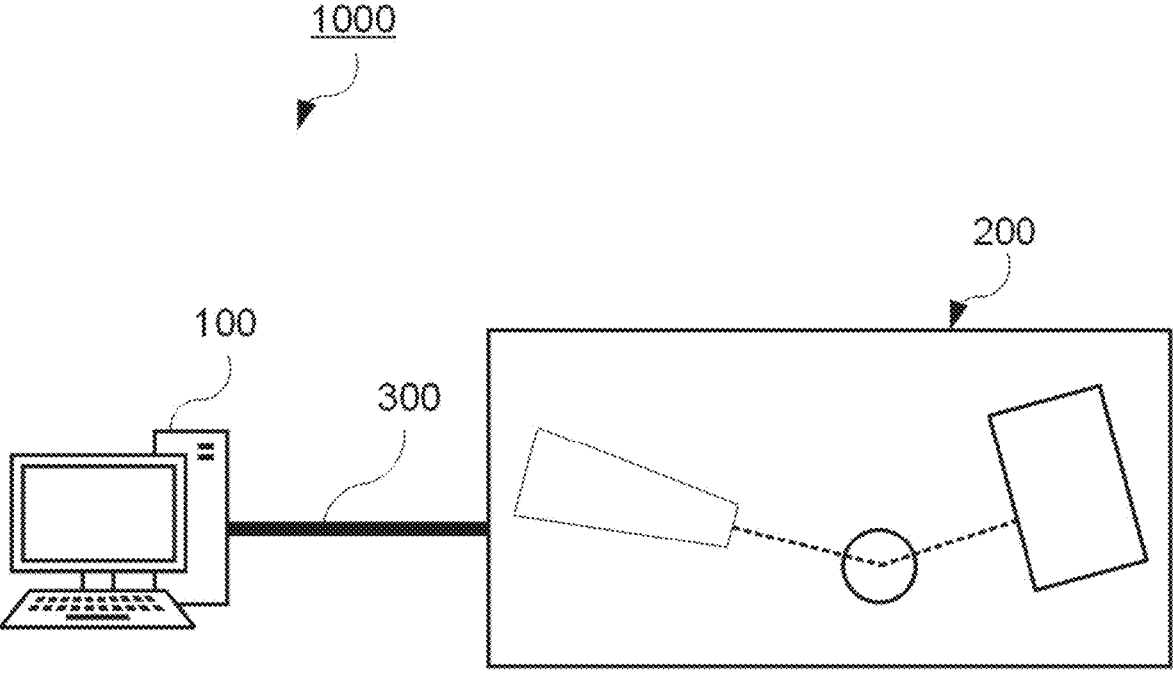
FIG. 4 shows an example of a system configuration of an information processing system according to a first embodiment.

FIG. 4 shows an example of a system configuration of the information processing system 1000 according to the first embodiment.

As shown in FIG. 4, the information processing system 1000 comprises a computer 100, an X-ray analysis apparatus 200, and a contact unit 300. The computer 100 is configured to communicate with the X-ray analysis apparatus 200 via the contact unit 300. Thereby, the computer 100 transmits or receives information mutually with the X-ray analysis apparatus 200. The computer 100 is an example of an information processing apparatus. In the first embodiment, the computer 100 may be an apparatus that analyzes profile obtained from reflectance measurement. In other embodiments, the computer 100 is an apparatus that analyzes profile obtained by rocking curve measurement or GI-SAXS measurement. The computer 100 may be a PC (Personal Computer), a tablet computer, a smartphone, or the like. Further, the contact unit 300 may be configured of any wired or wireless connection.
2. Hardware Configuration Next, a hardware configuration of the computer 100 and the X-ray analysis apparatus 200 will be described.
2.1 Hardware Configuration of Computer 100

Figure 5:
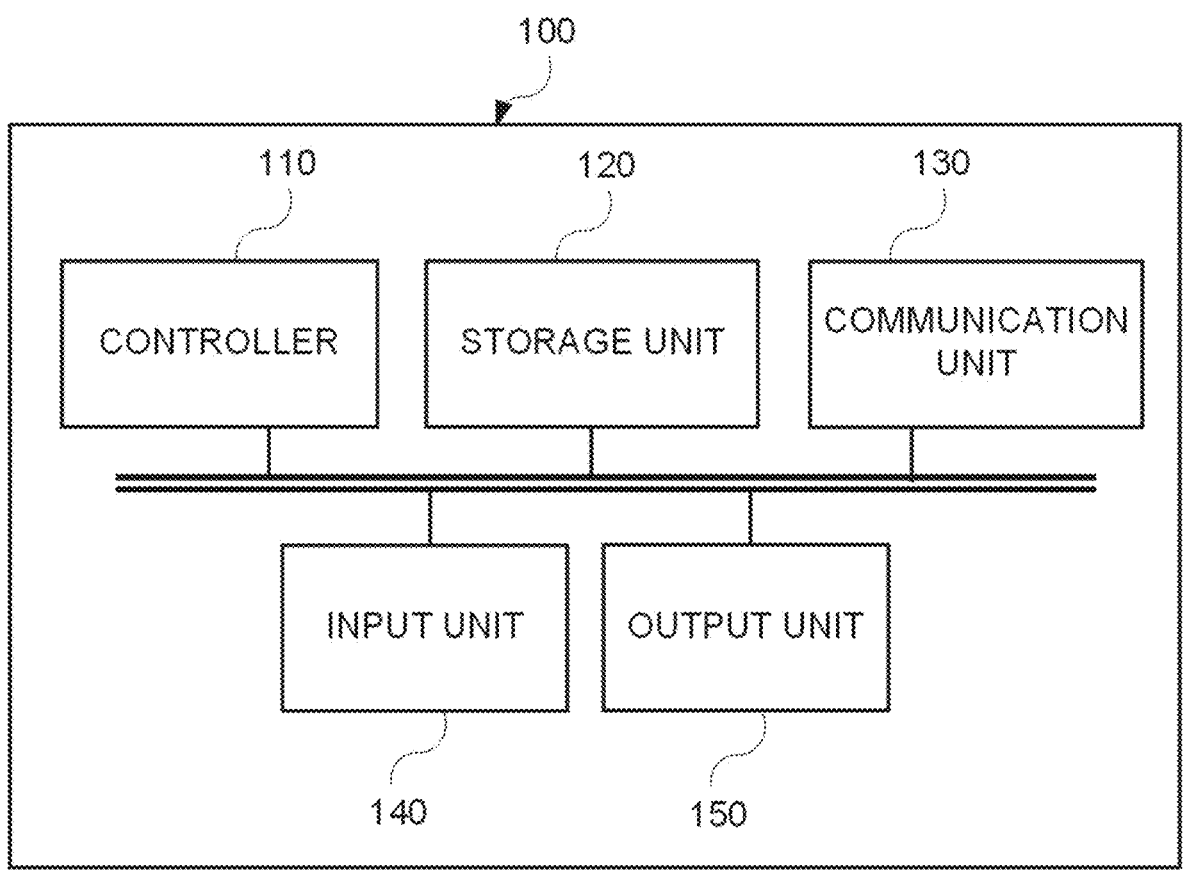
FIG. 5 shows an example of a hardware configuration of a computer according to the first embodiment.

FIG. 5 shows an example of a hardware configuration of the computer 100 according to the first embodiment.

As shown in FIG. 5, the computer 100 comprises a controller 110, a storage unit 120, a communication unit 130, an input unit 140, and an output unit 150, and these components are electrically connected via a communication bus inside the computer 100. Each component will be further described later. The computer 100 executes a process in relation to the embodiment.

The controller 110 performs process and control of overall operation in relation to the computer 100. The controller 110 is, for instance, a central processing unit (CPU). The controller 110 reads a predetermined program stored in the storage unit 120 and executes processing based on the program, thereby realizing various functions in relation to the computer 100, for example, processing shown in FIG. 7 which will be describe later. The controller 110 is not limited to single, and a plurality of controllers 110 may be provided for each function. A combination thereof may also be applied.

The storage unit 120 stores various information as defined by the above description. It may be implemented as, for example, a storage device such as a solid state drive (SSD) that stores various programs in relation to the computer 100 executed by the controller 110, or as a temporary memory such as a random access memory (RAM) that stores temporarily necessary information (arguments, arrays, etc.) in relation to program operation. The storage unit 120 stores various programs in relation to the computer 100 executed by the controller 110, variables, data used when the controller 110 executes processing based on the programs, or the like. The storage unit 120 is an example of a storage medium.

The communication unit 130 preferably uses wired communication means such as USB, IEEE 1394, Thunderbolt, and wired LAN network communication, etc., but wireless LAN network communication, mobile communication such as LTE/3G/4G/5G, and Bluetooth (registered trademark) communication, etc. may also be included as necessary. In other words, it is more preferable to implement as a set of these communication means. That is, the computer 100 may communicate various information from outside via the communication unit 130.

The input unit 140 may be included in a housing of the computer 100 or may be externally attached. For example, the input unit 140 may be implemented as a touch panel integrated with the output unit 150. With a touch panel, a user can input a tap operation, a swipe operation, or the like. Of course, a switch button, a mouse, a QWERTY keyboard, or the like may be employed instead of the touch panel. In other words, the input unit 140 receives input based on an operation performed by the user. The input is transferred as an instruction signal to the controller 110 via a communication bus, and the controller 110 may perform a predetermined control or calculation as necessary.

The output unit 150 can function as a display unit of the computer 100. The output unit 150 may be included in the housing of the computer 100, for example, or may be externally attached. The output unit 150 displays a screen of a graphical user interface (GUI) that can be operated by the user. GUI) screen that can be operated by the user. For example, it is preferable to use different type of display device, such as a CRT display, a liquid crystal display, an organic EL display, or a plasma display, according to the type of the computer 100.

2.2 Hardware Configuration of X-ray Analysis Apparatus 200

The X-ray analysis apparatus 200 comprises an X-ray source, a sample, and a detector. X-ray is radiated from the X-ray source, and the detector detects the X-ray reflected by the sample to obtain a measurement profile. The X-ray analysis apparatus 200 and the computer 100 are configured to communicate, and perform measurement start instruction, measurement profile transfer, or the like. In another embodiment, the X-ray analysis apparatus 200 acquires the measurement profile by detecting X-ray diffracted or scattered by the sample with the detector.

Functional Configuration

Hereinafter, the functional configuration of the computer 100 will be described.

3.1 Functional Configuration of Computer 100

Figure 6:
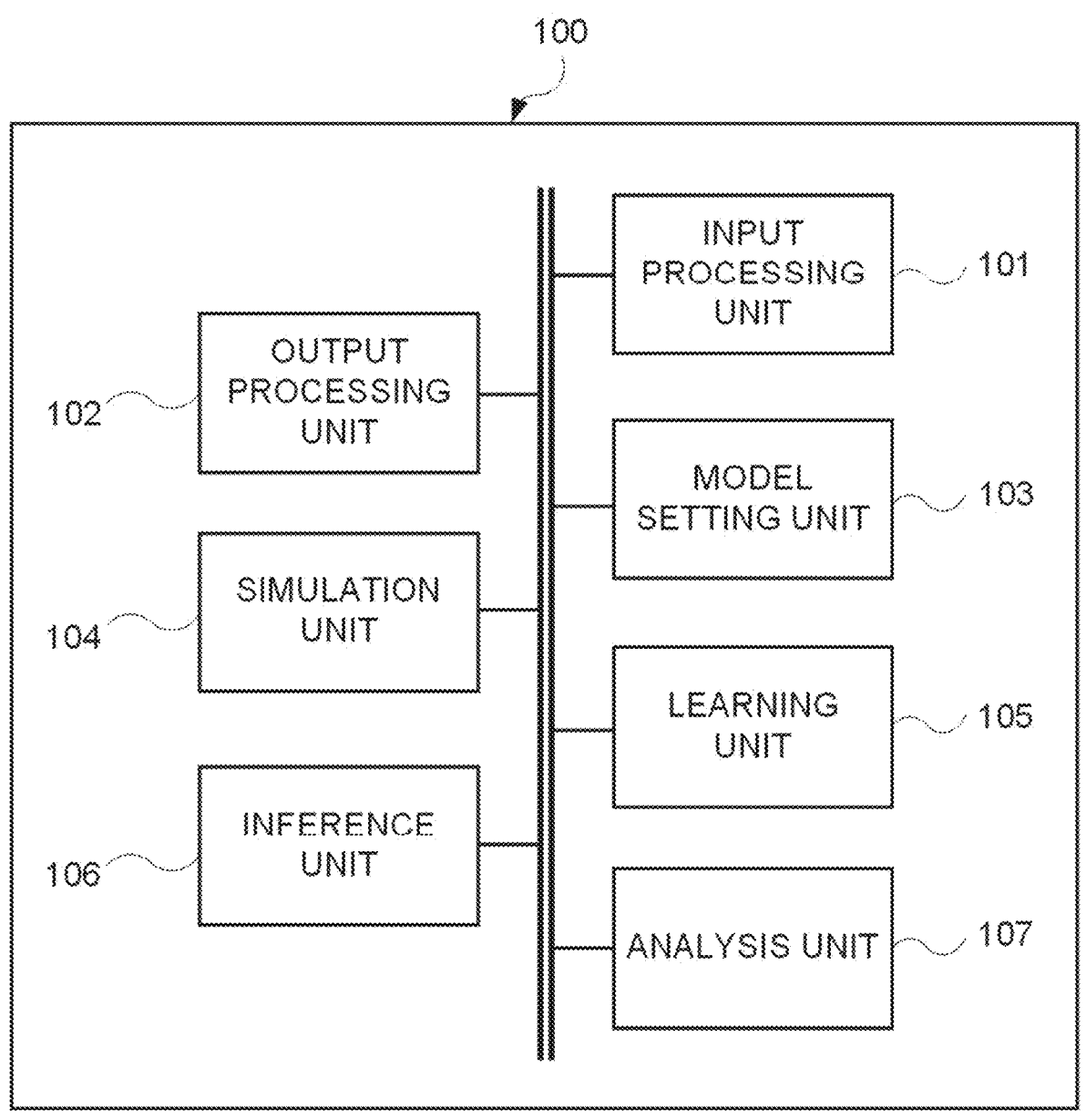
FIG. 6 shows an example of a functional configuration of a computer according to the first embodiment.

FIG. 6 is a diagram showing an example of the functional configuration of the computer 100.

As shown in FIG. 6, the computer 100 comprises an input processing unit 101, an output processing unit 102, a model setting unit 103, a simulation unit 104, a learning unit 105, an inference unit 106, and an analysis unit 107.

The input processing unit 101 controls processing in relation to input of signal to the computer 100.

The output processing unit 102 controls processing in relation to output of signal from the computer 100.

The model setting unit 103 sets parameter, parameter space, etc. of a film model used for teacher data.

The simulation unit 104 performs an X-ray intensity simulation for a set film model, and calculates a measurement simulation profile that serves as the teaching data.

The learning unit 105 allows a neural network to learn using parameter of the film model and the measurement simulation profile as teacher data.

The inference unit 106 estimates an initial value parameter using a new measurement profile and the trained neural network.

The analysis unit 107 obtains correct solution parameter by using a local optimization method for the obtained initial value parameter. Also, the analysis unit 107 may be configured to obtain parameter by using a global optimization method (genetic algorithm, parallel tempering, etc.).

4. Information Processing Method

In this section, an example of information processing executed by the computer 100 and the X-ray analysis apparatus 200 described above will be illustrated.

4.1 Overview of Information Processing

An overview of information processing will be described with reference to FIG. 7.

Figure 7:
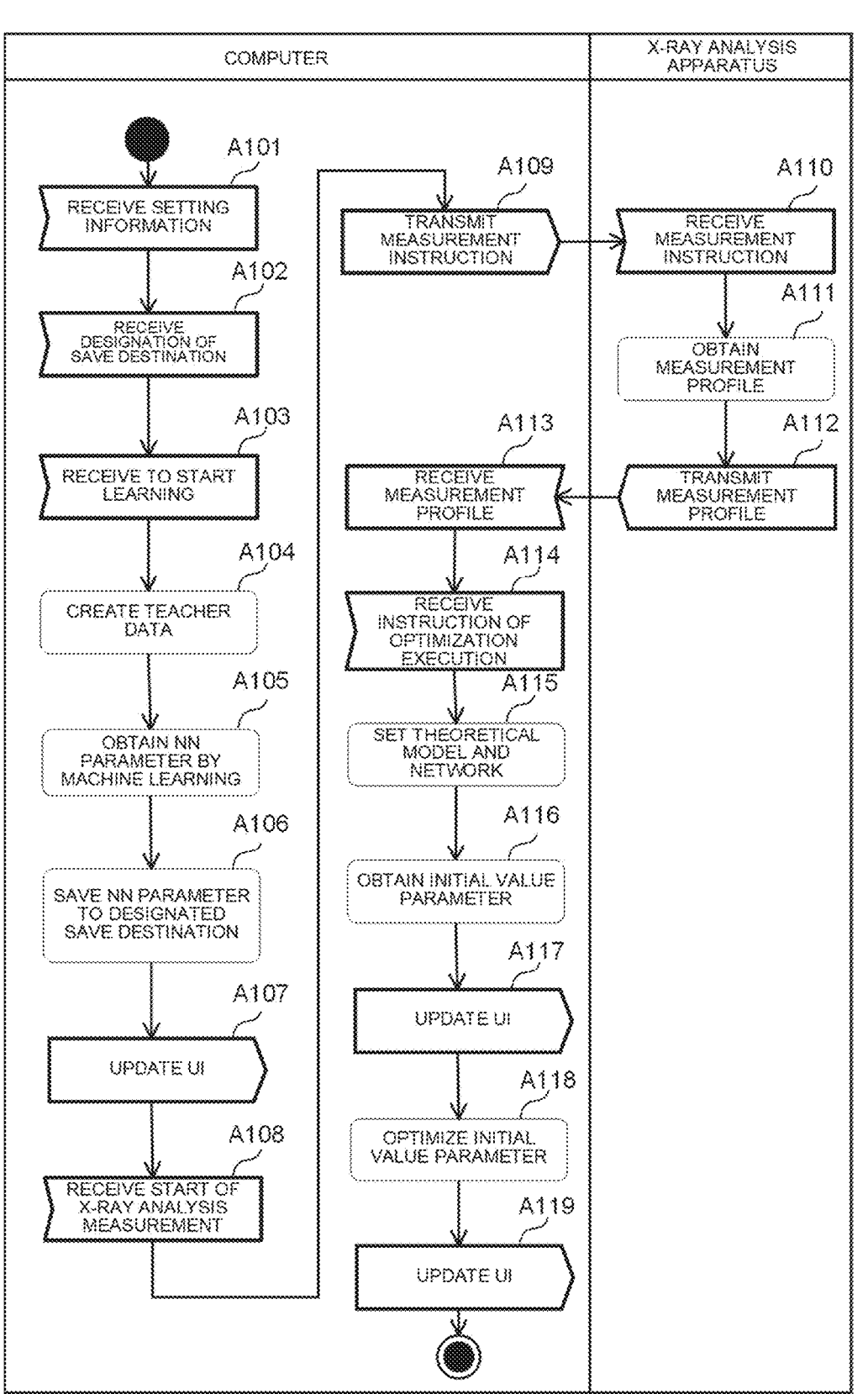
FIG. 7 is an activity diagram showing an example of information processing.

FIG. 7 is an activity diagram showing an example of information processing.

Processing from A101 to A107 is processing during execution of learning, processing from A108 to A113 is processing for measurement (acquisition of measurement profile), and processing from A114 to A119 is processing during initial value estimation and optimization execution. Each process of learning, measurement, and initial value estimation may be performed continuously as a series of operations or may be performed individually for each process.

In A101, the input processing unit 101 receives input of setting information via the input unit 140. The setting information includes setting of the parameter of the film model, setting of the parameter space of the film model, setting of the neural network, or the like. Here, the parameter space is data with a range of parameter, such as 8-10 nm in the case of film thickness.

In A102, the input processing unit 101 receives a designation of save destination of learning data via the input unit 140. At this time, the setting information is similarly saved to the designated save destination.

In A103, the input processing unit 101 receives an instruction to start learning via the input unit 140.

Details of the processing from A101 to A103 will be described later with reference to FIG. 8.

In A104, the model setting unit 103 sets the film model based on the setting of parameter of the film model included in the setting information. After that, the simulation unit 104 sets parameter for each step within the parameter space of the film model, and creates a measurement simulation profile corresponding to the parameters for each step. Furthermore, the simulation unit 104 saves the teacher data in which the parameter and the measurement simulation profile are associated with each other in the storage unit 120.

In A105, the learning unit 105 allows the neural network to learn using the teacher data. The learning unit 105 obtains parameter in relation to weight and bias from the learned neural network. In the present embodiment, to distinguish from parameter in relation to a thin film, such as thickness, the parameter in relation to the neural network is referred to as NN (Neural Network) parameter. In the present embodiment, although the NN parameter is described as including information in relation to weight and bias, it may be treated as including information such as the number of neurons in each layer, the number of layers in an intermediate layer, the type of layer, activation function, etc. in addition to the weight and the bias.

Details of the processing of A105 will be described later with reference to FIG. 9.

In A106, the output processing unit 102 saves the NN parameter in the designated save destination.

In A107, the output processing unit 102 displays on the output unit 150 that the NN parameter has been saved and that learning has ended.

The processing up to this point is the processing at the time of execution of learning.

Subsequent steps are the processing at the time of execution of optimization.

In A108, the input processing unit 101 receives an instruction to start X-ray analysis measurement by the X-ray analysis apparatus 200 via the input unit 140.

In A109, the output processing unit 102 transmits an instruction to start measurement to the X-ray analysis apparatus 200 via the communication unit 130 and the contact unit 300.

In A110, the X-ray analysis apparatus 200 receives an instruction to start measurement from the computer 100 via the contact unit 300.

In A111, the X-ray analysis apparatus 200 allows X-ray to irradiate to the thin film and obtains a measurement profile from the X-ray reflected from the thin film.

In A112, the X-ray analysis apparatus 200 transmits the obtained measurement profile to the computer 100 via the contact unit 300.

In A113, the input processing unit 101 receives the measurement profile from the X-ray analysis apparatus 200.

In A114, the input processing unit 101 receives an optimization start instruction via the input unit 140.

In A115, the model setting unit 103 sets the film model based on the setting information. The inference unit 106 sets a learned neural network based on the NN parameter and the setting of the neural network included in the setting information.

In A116, the inference unit 106 acquires initial value parameter by inputting the measurement profile to the learned neural network.

Details of the processing of A116 will be described later with reference to FIG. 10.

In A117, the output processing unit 102 displays the initial parameter on the output unit 150.

In A118, the analysis unit 107 obtains the correct solution parameter by optimizing the initial value parameter with the local optimization method.

In A119, the output processing unit 102 displays the correct solution parameter on the output unit 150.

Figure 8:
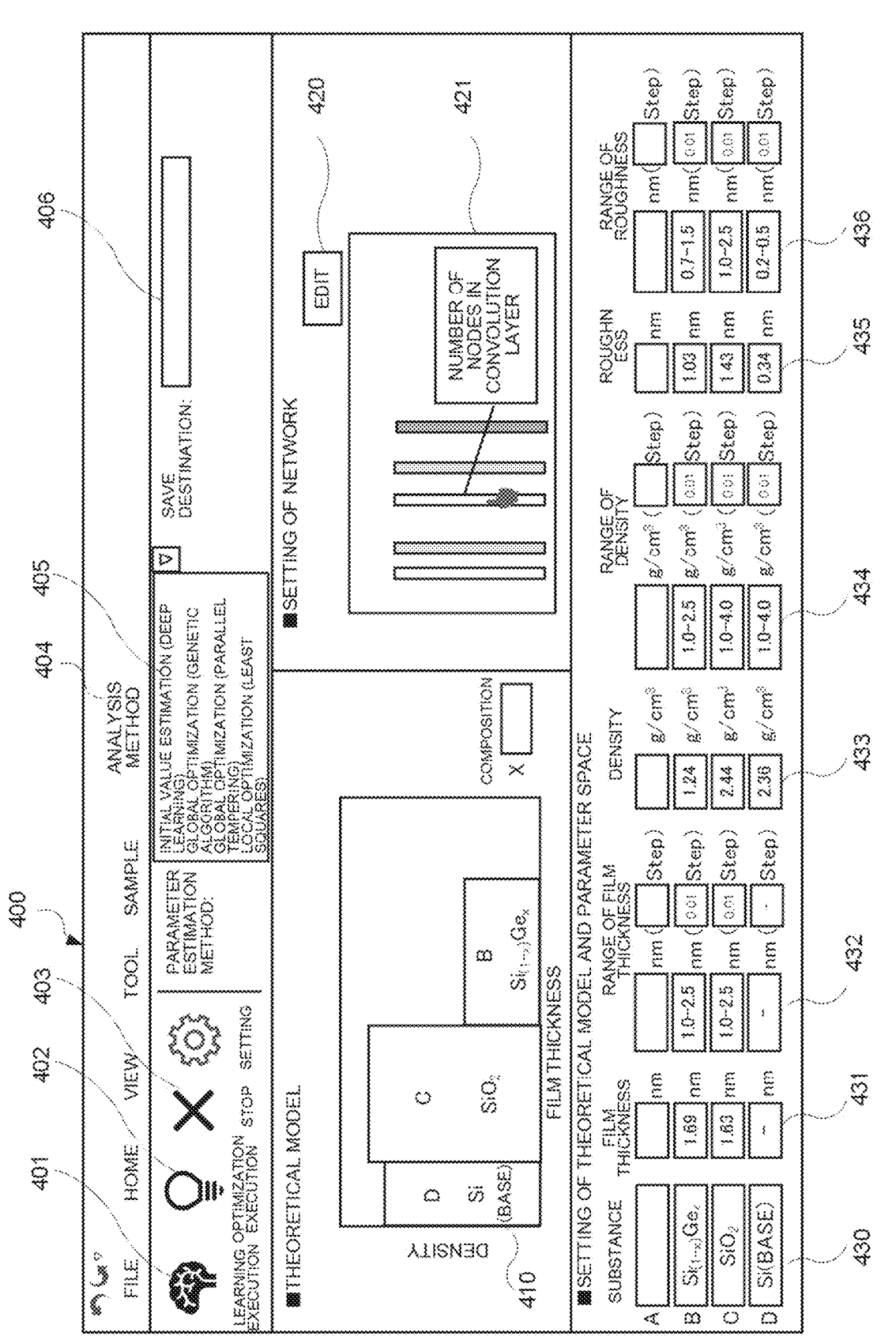
FIG. 8 shows an example of a computer screen.

FIG. 8 is a diagram showing an example of a screen 400 of the computer 100.

The screen 400 includes a learning execution button 401, an optimization execution button 402, a stop button 403, an analysis method selection unit 404, a parameter estimation method selection unit 405, a save location designation unit 406, a film model display unit 410, a learning algorithm edition unit 420, a learning algorithm display unit 421, a substance designation unit 430, a film thickness designation unit 431, a film thickness range designation unit 432, a density designation unit 433, a density range designation unit 434, a roughness designation unit 435, and a roughness range designation unit 436. In another embodiment, the screen 400 is provided with a composition designation unit, a composition range designation unit, a particle size distribution designation unit, a particle size distribution range designation unit, or the like.

By operating the learning execution button 401, the optimization execution button 402, or the stop button 403, each processing such as learning execution, optimization execution, or processing stop is executed.

Specifically, the input processing unit 101 receives the selection of the learning execution button 401 or the optimization execution button 402 via the input unit 140. When the learning execution button 401 is selected, the learning unit 105 confirms whether the setting condition and the designation of the save destination are set. If these settings have been made, the learning unit 105 starts learning execution. When the optimization execution button 402 is selected, the inference unit 106 confirms whether the setting condition, the NN parameter and the measurement profile are stored in the designated destination. If these data are stored in the designated destination, the inference unit 106 starts the optimization execution. When the stop button 403 is selected, the learning unit 105 or the inference unit 106 transmits an instruction to stop processing.

This allows learning or optimization to be performed under appropriate condition.

The analysis method can be changed by operating the analysis method selection unit 404.

Specifically, the input processing unit 101 switches the analysis method to reflectance, rocking curve, GI-SAXS, or the like by operating the analysis method selection unit 404 via the input unit 140. When the analysis method is switched, the input processing unit 101 updates theoretical model, parameter type of the theoretical model/parameter setting, or the like. These theoretical models, the parameter type of the theoretical model/parameter setting, or the like may be configured in such a manner that the user can arbitrarily select them for each analysis method.

Further, the parameter estimation method can be changed by operating the parameter estimation method selection unit 405.

Specifically, the input processing unit 101 switches the parameter estimation method to the initial value estimation, the global optimization method, or the local optimization method by operating the parameter estimation method selection unit 405 via the input unit 140.

This allows optimization to be performed using appropriate method. Further, the analysis process may be automatically selected using macro or the like.

The save location designation unit 406 displays the save location of setting information such as the parameter of the film model and the NN parameter of the neural network, as well as of acquired information.

The film model display unit 410 displays an image of the film model that visually represents substance name, film thickness, density, and roughness. Note that the film model display unit 410 may be provided with a region for designating composition of the substance.

Specifically, the input processing unit 101 receives input of information to the substance designation unit 430, the film thickness designation unit 431, the density designation unit 433, and the roughness designation unit 435 via the input unit 140. The output processing unit 102 updates the film model display unit 410 based on the information. In another embodiment, the input processing unit 101 may update the film model display unit 410 based on information input to the composition designation unit or the particle size distribution designation unit.

This allows learning or optimization to be performed while confirming the film model.

The learning algorithm edition unit 420 is configured to edit configuration of neural network such as CNN (Convolutional Neural Network), RNN (Convolutional Neural Network), etc., the type of layer to be used, the number of nodes in a layer, the number of layers, the number of profiles used for learning, or the like. The number of profiles used for learning can be automatically calculated by giving range and step of each parameter by designating the film thickness range designation unit 432, the density range designation unit 434, the roughness range designation unit 436, or the like. The learning algorithm display unit 421 displays the type of layer to be used, the number of nodes in the layer, number of layers, or the like. For instance, when using a CNN, by selecting the learning algorithm edition unit 420, information such as the number of nodes in a convolutional layer, filter value, kernel size value, stride value, or the like are displayed in an editable manner.

The output processing unit 102 appropriately modifies the setting information according to edition result of the learning algorithm edition unit 420, stores it in the storage unit 120, and outputs it to the output unit 150.

This allows optimization or learning to be performed while confirming the neural network.

At this time, the neural network 600 may be set for each sample using the neural network 600, or may be set for each user. Here, each user is not limited to each individual such as who performs the analysis, but each organization such as which team, group or company performs the analysis, each purpose of analysis such as what kind of analysis is performed, and each measurement object such as what kind of substance is handled. It is understood that each purpose and each object to be measured, such as what kind of substance is handled, may be included as well.

A case of setting for each user will be described. When machine learning is executed, the learning unit 105 stores the setting of the neural network and the NN parameter in the storage unit 120 in association with identification information of the user. When a new machine learning is executed, the learning unit 105 refers to the setting of past neural network and the NN parameter in association with the identification information of the user. The learning unit 105 or the inference unit 106 performs learning or optimization using the setting of past neural network and the NN parameter.

This allows the neural network to be set appropriately.

The substance designation unit 430 is configured to input information for specifying substance such as chemical formula of each layer such as SiO 2, or substance name such as ITO (Indium Tin Oxide). The film thickness designation unit 431, the density designation unit 433, and the roughness designation unit 435 are configured in such a manner that the film thickness, density, and roughness of the film model for each layer can be input. The film thickness range designation unit 432, the density range designation unit 434, and the roughness range designation unit 436 are configured in such a manner that the parameter space of film thickness, density, and roughness of the film model for each layer can be input. Further, the film thickness range designation unit 432, the density range designation unit 434, and the roughness range designation unit 436 are configured in such a manner that the number of steps can be input. The number of steps is a value that designates at which numerical interval the designated parameter space is to be ticked to create the measurement simulation profile.

When the learning execution button 401 is selected, the simulation unit 104 creates the measurement simulation profile for the substance designated in the substance designation unit 430 by simulating the parameter space designated in the thickness range designation unit 432, the density range designation unit 434, and the roughness range designation unit 436 for each step number. The learning unit 105 allows the neural network to learn using the parameter designated by each designation unit and the measurement simulation profile corresponding to the parameter. Specifically, the learning unit 105 allows the neural network to learn using a measurement simulation profile 502 that is theoretically determined by setting substance, film thickness, density, and roughness of each layer of the thin film as profile data. The learning unit 105 optimizes the NN parameter of the neural network 600 according to structure of the thin film, the number of layers of the thin film, and parameter to be optimized. Here, the structure of the thin film can include information in relation to substance or the like. Further, the number of layers of the thin film can include information such as the number of each layer of the thin film, the number of layers included in unit structure of superlattice, or the like. Additionally, parameter to be optimized may include information such as thickness, density, roughness, etc. of the thin film. The parameter to be optimized in the rocking curve measurement can include information on composition, film thickness, lattice constant, etc. of the thin film. Moreover, the parameter to be optimized in the GI-SAXS measurement can include information on size distribution of pore size, size distribution of particle size, or the like.

This allows efficient learning to be executed since a neural network is set for each film model.

Figure 9:
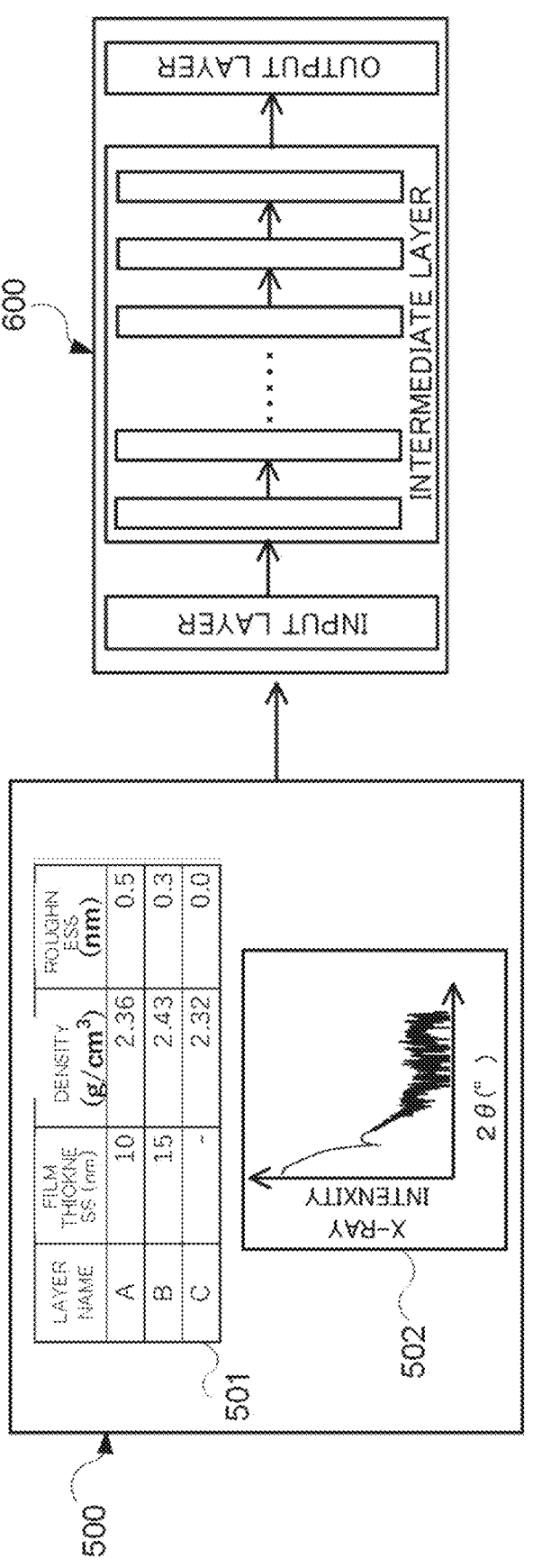
FIG. 9 shows an example of information processing during a learning execution using a neural network.

FIG. 9 is a diagram showing an example of information processing during learning execution using a neural network.

FIG. 9 includes teacher data 500 and a neural network 600. The teacher data 500 includes parameter 501 and measurement simulation profile 502. The neural network 600 includes an input layer, an intermediate layer, and an output layer.

Figure 10:
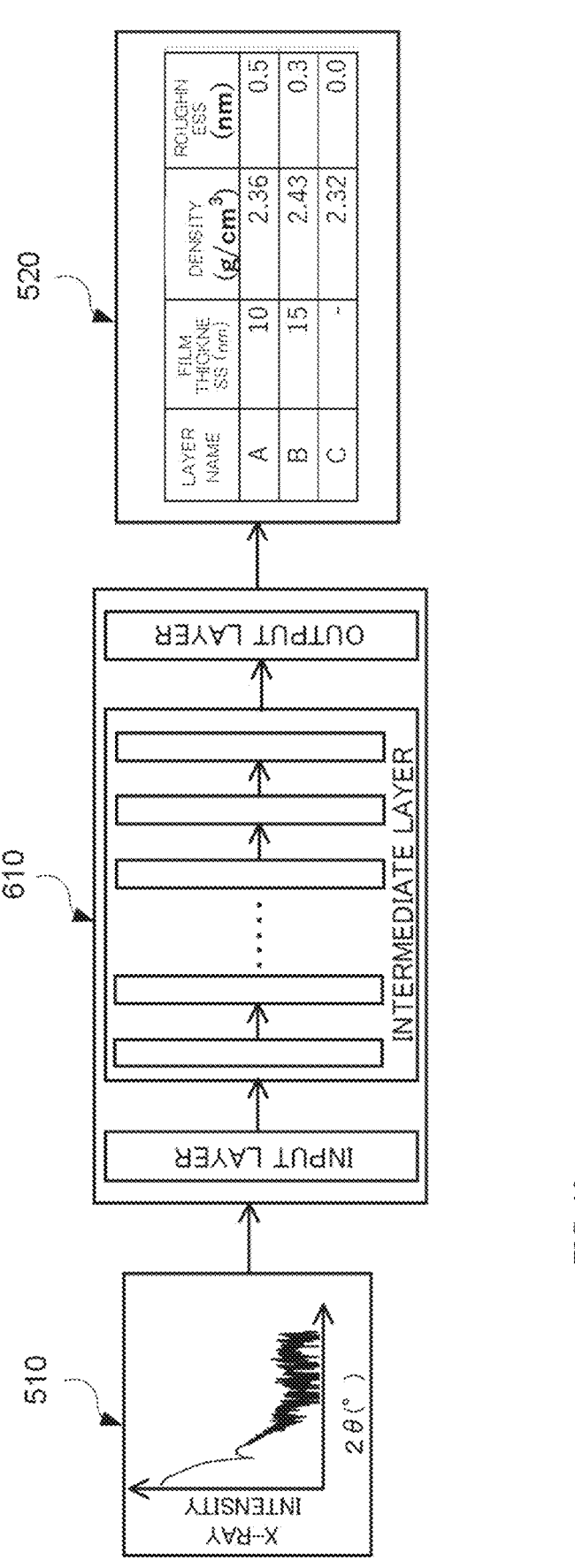
FIG. 10 shows an example of information processing during a learning execution using a neural network.

FIG. 10 is a diagram showing an example of information processing during optimization execution using a neural network.

FIG. 10 includes a measurement profile 510, an initial value parameter 520 and a learned neural network 610. The learned neural network 610 is a neural network that is allowed to machine-learn teacher data 500 using the measurement simulation profile 502 relating to an intensity of X-ray from a thin film as input data and using parameter 501 relating to the thin film as output data.

The learning unit 105 generate a neural network 610 that is allowed to machine-learn the teacher data 500 using the measurement simulation profile 502 in relation to the intensity of X-ray from the thin film as input data and using parameter 501 in relation to the thin film as output data, and storage the neural network 610 in the storage unit 120. Here, a measurement profile may be used as the profile data in addition to the measurement simulation profile. Subsequently, the inference unit 106 outputs the initial value parameter 520 in relation to the thin film by inputting the measurement profile 510 relating to the intensity of X-ray indirectly obtained from the X-ray analysis apparatus 200 to the learned neural network 610. Finally, the analysis unit 107 obtains correct solution parameter by using a local optimization method on the initial value parameter.

This allows the correct solution parameter to be obtained more efficiently than method that directly obtains correct solution by machine learning, method that obtains correct solution by global optimization method, or the like.

According to the first embodiment described above, correct solution parameter can be obtained without requiring a lot of time for analysis. In addition, since the analysis does not take much time, correct solution parameter can be obtained without any problem even when using a computer with inferior processing power. Furthermore, since a computer with inferior processing power can be used, optimization can be performed at a lower cost than in the past.

Second Embodiment

Next, we will discuss the case in which the setup of a neural network by machine learning is performed on an external server.

1. System Configuration

Hereinafter, an example of an information processing system of a second embodiment will be described. The information processing system of the second embodiment comprises a server and a network in addition to the configuration of the first embodiment. Further, a computer in the second embodiment is connected to the server via a network.

2. Hardware Configuration

For each hardware configuration of the computer and an X-ray analysis apparatus in the second embodiment, please refer to the first embodiment.

In addition, the server in the second embodiment comprises a controller, a storage unit, and a communication unit, and these components are electrically connected via a communication bus inside the server. For specific description of the controller, the storage unit, and the communication unit, please refer to the descriptions of the controller 110, the storage unit 120, and the communication unit 130 of the computer 100 in the first embodiment.

3. Functional Configuration

Functional configuration of the computer and the server in the second embodiment are similar to the functional configuration of the computer 100 in the first embodiment.

4. Information Processing Method

Compared with the first embodiment, the second embodiment requires transmission and reception of information between the computer and the server, thus some processing is added.

Specifically, after the processing of A103 in the first embodiment, an output processing unit of the computer transmits setting information to the server via the communication unit and the network. Next, an input processing unit of the server receives the setting information obtained from the computer and saves the setting information in the storage unit of the server. After that, the server performs processing of A104 and A105. After A105, the output processing unit of the server transmits the obtained NN parameter to the computer via the communication unit and the network. Then, the computer saves the obtained NN parameter in the designated save destination. That is, an output processing unit 102 of the computer allows data of a learned neural network to be downloaded from the server to the storage unit. Here, the data of the learned neural network to be delivered is not limited to the NN parameter, and may be, for instance, the learned neural network itself. The server is an example of an external apparatus.

As a result, a machine learning service can be provided by an external server.

Other

As another embodiment, in the first embodiment or the second embodiment, it may be configured that optimization may be performed by the server. In that case, processing for sharing information between the computer and the server is added as appropriate.

The present invention may be provided in each of the following aspects.

The information processing apparatus, wherein: the parameter result is initial value information configured of a substantially correct solution parameter.

The information processing apparatus, wherein: the processor is configured to execute the program so as to set the neural network according to a structure of a thin film, a number of layer and a parameter to be optimized.

The information processing apparatus, wherein: the processor is configured to execute the program so as to use a measurement simulation profile theoretically determined by setting at least one of substance, film thickness, density, roughness, composition, lattice constant and size distribution, of each layer of a thin film as the profile data.

The information processing apparatus, wherein: the parameter data and the parameter result are information in relation to at least one of film thickness, density, roughness, composition, lattice constant, and size distribution of a thin film.

The information processing apparatus, further comprising: a storage unit, wherein the processor is configured to execute the program so as to download data of the neural network from an external apparatus and allow the storage unit to store the data of the neural network.

The information processing apparatus, wherein: the parameter result is initial value information including a substantially correct solution parameter, and the processor is configured to execute the program so as to obtain a correct solution parameter by optimizing the initial value information.

The information processing apparatus, wherein: the processor is configured to execute the program so as to obtain a correct solution parameter by applying a local optimization method to the initial value information.

An information processing apparatus comprising: a processor configured to execute a program so as to generate a neural network that is allowed to machine-learn teacher data using profile data in relation to an intensity of X-ray from a thin film as input data and using parameter data in relation to the thin film as output data; and a storage unit storing the neural network.

The information processing apparatus, wherein: the neural network is set for each user that uses the neural network.

An information processing method executed by an information processing apparatus, comprising: allowing a parameter result to output by inputting a profile result in relation to an intensity of X-ray from a thin film to a neural network, wherein the neural network is a neural network that is allowed to machine-learn teacher data using profile data in relation to an intensity of X-ray from a thin film as input data and using parameter data in relation to the thin film as output data.

A non-transitory computer readable media storing a program, wherein: the program allows a computer to function as the information processing apparatus.

An X-ray analysis apparatus, configured to: allow X-ray to incident to a thin film, obtain a profile result from X-ray reflected, diffracted or scattered from the thin film, and transmit the profile result to the information processing apparatus.

Of course, the above aspects are not limited thereto.

Finally, various embodiments of the present invention have been described, but these are presented as examples and are not intended to limit the scope of the invention. The novel embodiment can be implemented in various other forms, and various omissions, replacements, and changes can be made without departing from the abstract of the invention. The embodiment and its modifications are included in the scope and abstract of the invention and are included in the scope of the invention described in the claims and the equivalent scope thereof.

What is claimed is:

1. An information processing apparatus comprising:

an X-ray analysis apparatus including an X-ray source and a detector; and a processor, wherein the X-ray source irradiates a thin film with X-rays, wherein the detector detects a reflected intensity of X-rays from the thin film, wherein the processor is configured to execute a program so as to output a parameter result in relation to a thin film by inputting, to a neural network, a profile result in relation to a reflected intensity of X-rays from the thin film in a reflectance measurement using the X-ray analysis apparatus, the profile result being generated based on the detected reflected intensity of X-rays, wherein the neural network is a neural network that has been trained through machine learning based on teacher data using profile data in relation to a reflected intensity of X-ray from a thin film as input data and using parameter data in relation to the thin film as output data, wherein the parameter data and the parameter result are information in relation to at least one of film thickness, density, and roughness of a thin film, wherein the parameter result is initial value information located within a parameter region enclosed by an ellipse formed around a correct solution parameter, wherein the processor is further configured to execute the program so as to obtain the correct solution parameter by optimizing the initial value information, and output the parameter result as an analysis result of a physical property of the thin film.

2. The information processing apparatus according to claim 1, wherein:

the parameter result is an initial value information configured of a correct solution parameter.

3. The information processing apparatus according to claim 1, wherein:

the processor is configured to execute the program so as to set the neural network according to a structure of a thin film, a number of layers and a parameter to be optimized.

4. The information processing apparatus according to claim 1, wherein:

the processor is configured to execute the program so as to use a measurement simulation profile theoretically determined by setting at least one of substance, film thickness, density, roughness, composition, lattice constant and size distribution, of each layer of a thin film as the profile data.

5. The information processing apparatus according to claim 1, further comprising:

a memory, wherein the processor is configured to execute the program so as to download data of the neural network from an external apparatus and allow the memory to store the data of the neural network.

6. The information processing apparatus according to claim 1, wherein:

the processor is configured to execute the program so as to obtain a correct solution parameter by applying a local optimization method to the initial value information.

7. The information processing apparatus according to claim 1, wherein:

the neural network is set for each user that uses the neural network.

8. A non-transitory computer readable media storing a program, wherein:

the program causes a computer to function as the information processing apparatus according to claim 1.

9. An X-ray analysis apparatus, configured to:

irradiate X-ray onto a thin film, obtain a profile result from X-ray reflected, diffracted or scattered from the thin film, and transmit the profile result to the information processing apparatus according to claim 1.

10. An information processing method executed by an information processing apparatus, comprising:

outputting a parameter result by inputting, to a neural network, a profile result in relation to a reflected intensity of X-ray from a thin film in a reflectance measurement using an X-ray analysis apparatus including an X-ray source irradiating the thin film with X-rays and a detector detecting the reflected intensity of the X-rays from the thing film, the profile result being generated based on the detected reflected intensity of X-rays, wherein the neural network is a neural network that has been trained through machine learning based on teacher data using profile data in relation to a reflected intensity of X-ray from a thin film as input data and using parameter data in relation to the thin film as output data, wherein the parameter data and the parameter result are information in relation to at least one of film thickness, density, and roughness of a thin film, wherein the parameter result is initial value information located within a parameter region enclosed by an ellipse formed around a correct solution parameter;

executing the program so as to obtain the correct solution parameter by optimizing the initial value information; and outputting the parameter result as an analysis result of a physical property of the thin film.

\* \* \* \* \*